Figure 1:
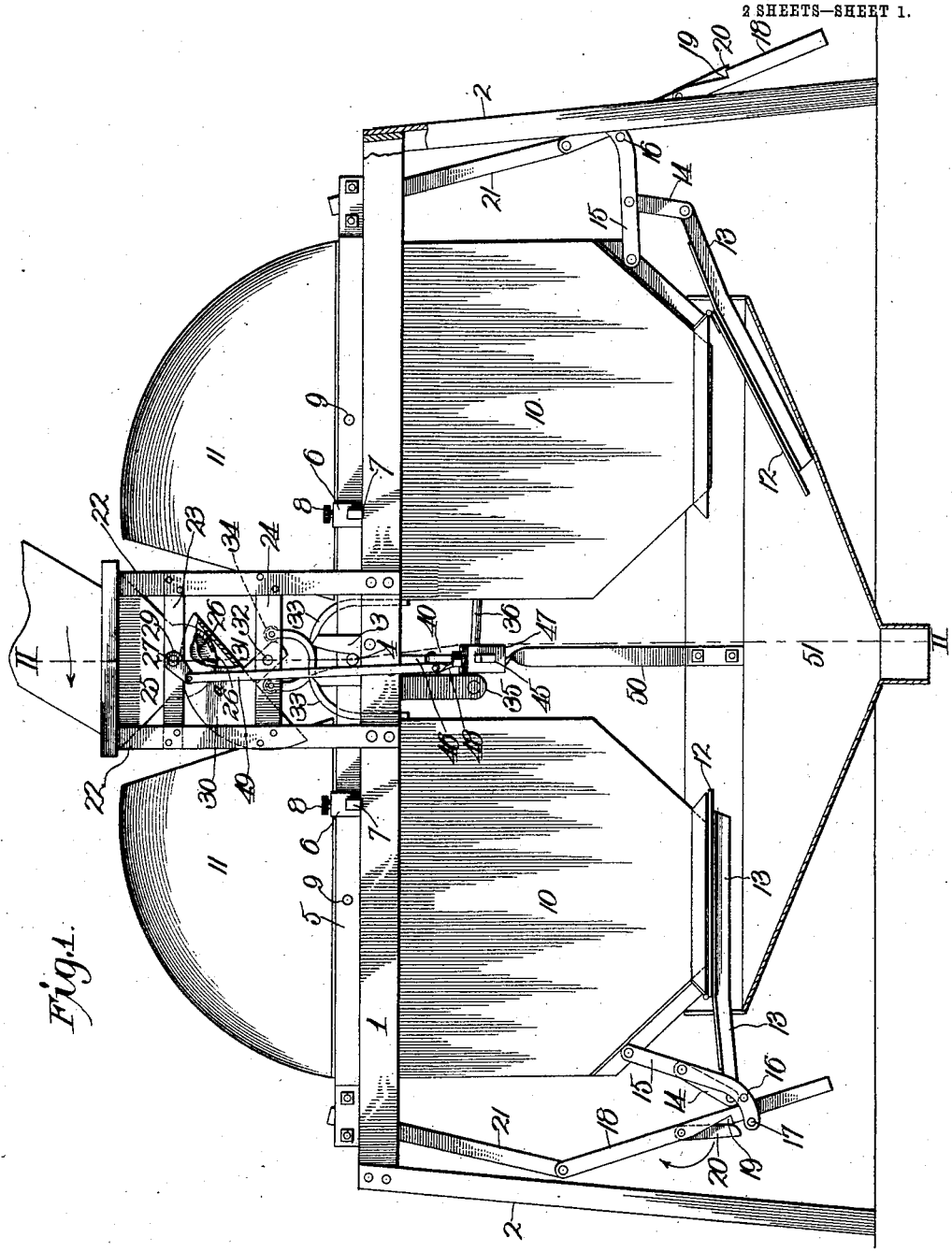

M. DAVIS.
GRAIN WEIGHING MACHINE.
APPLICATION FILED APR. 17, 1908.

915,940.

Patented Mar. 23, 1909.
2 SHEETS—SHEET 1.

Witnesses
Frank R Elon
H. C. Rodgers

Inventor,
Monroe Davis
By George H Thorpe atty.

M. DAVIS.
GRAIN WEIGHING MACHINE.
APPLICATION FILED APR. 17, 1908.
915,940.
Patented Mar. 23, 1909.
2 SHEETS—SHEET 2.
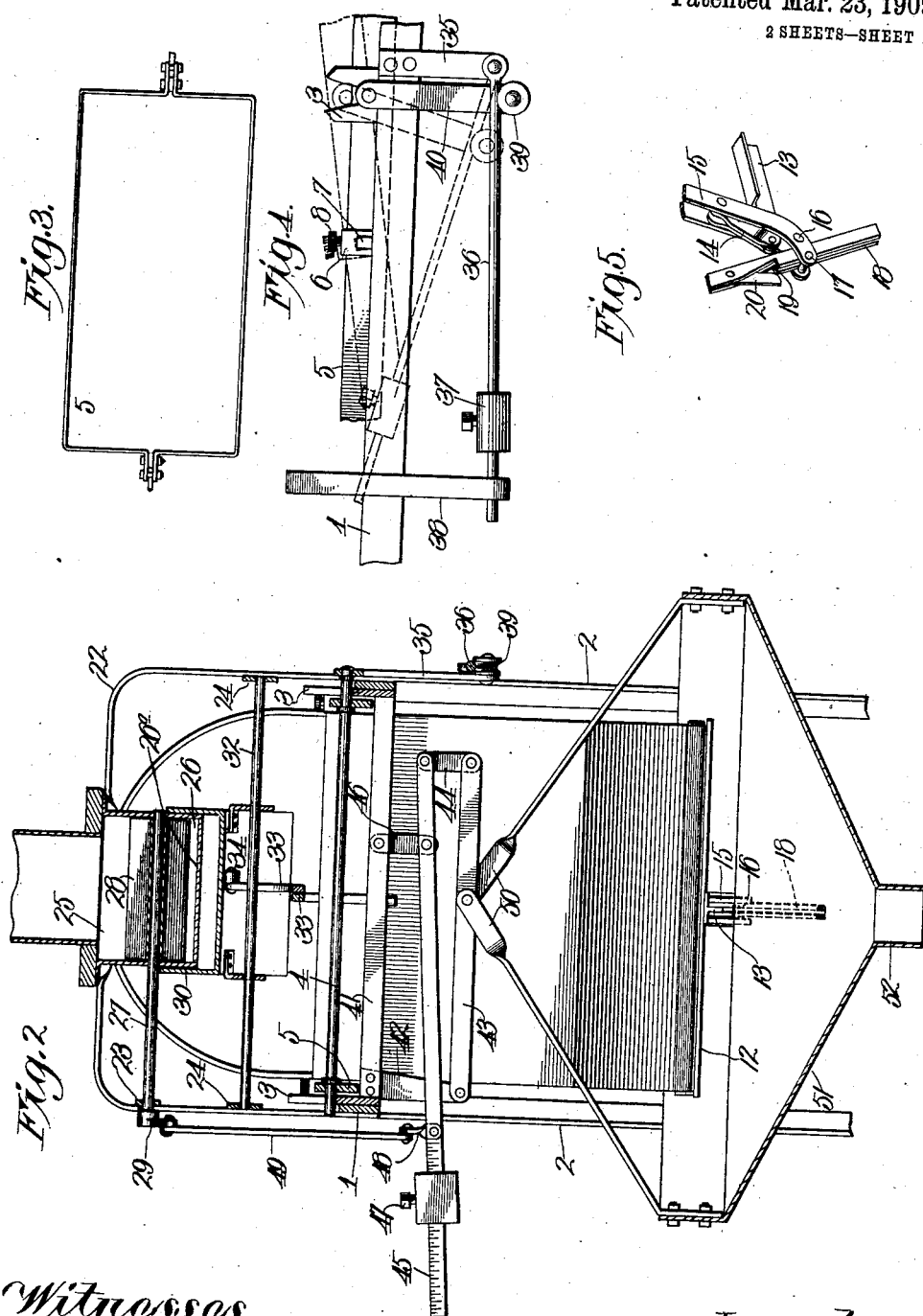
Witnesses
Frank R. Elon
H. C. Rodgers
Inventor
Monroe Davis
By George H. Thorpe Atty

UNITED STATES PATENT OFFICE.

MONROE DAVIS, OF BLACKWELL, OKLAHOMA.

GRAIN-WEIGHING MACHINE.

No. 915,940.　　　Specification of Letters Patent.　　　Patented March 23, 1909.

Application filed April 17, 1908. Serial No. 427,734.

*To all whom it may concern:*

Be it known that I, MONROE DAVIS, a citizen of the United States, residing at Blackwell, in the county of Kay and State of Oklahoma, have invented certain new and useful Improvements in Grain-Weighing Machines, of which the following is a specification.

This invention relates to automatic scales, of that type embodying a pair of hoppers, alternately charged with and discharging grain, and my object is to produce a scale of this character which operates efficiently and reliably, and by which the grain is discharged as rapidly as the rollers of a mill can dispose of it.

A further object, is to produce a machine of this character whereby grain shall be weighed accurately and the weighing hoppers be caused to respond quickly to fluctuations of the weight imposed upon them.

With these objects in view, the invention consists in certain novel and peculiar features of construction and organization as hereinafter described and claimed; and in order that it may be fully understood, reference is to be had to the accompanying drawing, in which—

Figure 1. is a side view of a weighing scale, embodying my invention, the concentrating hopper being shown in section. Fig. 2. is a section, on the line II—II of Fig. 1. Fig. 3. is a plan view, on a reduced scale, of a frame forming part of the machine. Fig. 4. is a view of a part of the opposite side of the machine from that disclosed by Fig. 1. Fig. 5. is a detail, perspective view, of a part of the gate mechanism of one of the hoppers of the machine.

In the said drawing, 1 indicates a rectangular, horizontally arranged frame, mounted upon supporting legs 2, and provided centrally of its sides with upwardly projecting forked guides 3, receiving the ends of a cross rod 4, extending across the center of a rectangular frame 5, arranged and adapted to rock in a vertical plane within frame 1.

6 are sleeves, mounted slidingly on the side bars of the frame 5, at opposite sides of and equal distances from cross rod 4. Said sleeves are equipped with outwardly projecting bearing arms 7, resting on frame 1, and with set screws 8, by which they may be clamped at the desired points on frame 5.

9 are cross rods, carried by frame 5 and forming pivotal supports for hoppers 10, provided with inwardly opening hoods 11, at their upper ends.

12 indicates gates to control the passage of the grain from the lower or discharging end of the hoppers, these gates having outwardly projecting handles 13, pivotally connected by links 14, with swing-arms 15, mounted on the hoppers, said swing-arms being provided near their free ends with a pair of pins 16 and 17, to engage the inner and outer edges, respectively, of swing-bars 18. Said bars are notched in their outer edges to provide upwardly-disposed shoulders 19, and pivoted to the bars so as to lap said shoulders at times are dogs 20. The bars 18 are pivotally suspended from bars 21, depending rigidly from the ends of frame 5.

22 indicate vertical, inverted-U-shaped frames, secured to the side bars of frame 1 at opposite sides of rod 4, the depending portions of said frames being connected at one side by a bar 23, and at both sides by bars 24.

25 is a hopper, supported by and between frames 22, and provided at its lower end with a semi-cylindrical bottom 26, having a central slot or discharge opening 26$^a$. Journaled in the hopper at its junction with the semi-cylindrical bottom 26 is a shaft 27, equipped with a valve 28, which, when closed, is disposed horizontally, so as to close communication between the hopper and said bottom. When the valve is open it occupies a vertical position and the grain is free to flow from the hopper through the discharge slot or opening of the bottom, the valve being operated through movement imparted to a crank arm 29, secured on the front end of the shaft 27. Underlying the hopper is a tiltable chute 30, of U-shape when viewed from the end of the machine, with its arms or flanges projecting upward and overlapping the adjacent portions of the semi-cylindrical hopper bottom. This chute is adapted to be tilted toward one side or the other, so as to compel the grain falling upon it from slot or opening 26$^a$, to pass into the hood at the side contiguous to the lower end of the chute, such grain, of course, passing into the corresponding hopper 10. The chute is provided centrally with depending arms 31, pivoted on a transverse rod 32 carried by bars 24.

Secured to and carried by the hoppers are brackets 33, equipped at their upper ends with anti-friction rollers 34, disposed at opposite sides of cross rod 32, the roller movable with each hopper, being disposed at the opposite side of rod 32, from such hopper, for a purpose which hereinafter appears.

35 is a bar depending rigidly from frame 1 and pivoted to said bar is an arm 36, equipped with an adjustable weight 37, and guided to swing in a vertical plane in a vertical guide or loop 38, secured to frame 1, at the opposite side of rod 4, from bar 35.

39 is a roller engaging the under side of bar 36, and carried at the lower end of an arm 40, pivoted on the contiguous end of rod 4.

41 is a cross bar for the central part of frame 1, and depending from said bar and hence from the rigid frame is a weighing mechanism for opening and closing the hopper valve, as hereinafter described.

The weighing mechanism is constructed as follows: 42 is a hanger depending from the front end of the cross bar 41 and fulcrumed at its front end on said hanger is a lever 43, connected at its rear end by a link 44, with the overlying, graduated scale beam 45, fulcrumed on a link 46, pivotally pendent from bar 41. The scale bar is equipped with an adjustable poise 47, and is connected pivotally by a link 48, with a pull and push rod 49, pivoted at its upper end to the crank arm 29, of the valve shaft. 50 indicate downwardly diverging bars, pivoted at their upper ends coincidently to lever 43, and secured at their lower ends to the concentrating hopper 51, underlying both of the hoppers and provided with a sliding-controlled spout 52.

When the machine is empty the hoppers occupy the same horizontal plane and the remaining parts are as shown in Fig. 1, except that the gates of both hoppers are closed. Assuming that grain is supplied to hopper 25, it will be seen that, as hereinbefore explained, it will be delivered to the hopper 10, contiguous to the depressed end of the chute. When said hopper is fully charged, it will move downward slightly by causing frame 5 to tilt with the contiguous bearing arms 7, as the fulcrum or tilting point, this tilting of frame 5 obviously causing the elevation of the companion hopper 10, rod 4 incidentally traveling upward in forks 3. The upward movement of the said companion or empty hopper, through the instrumentality of its bracket 33, reverses the position of the tiltable chute, so as to cause the same to discharge the grain from hopper 25, into the raised or empty hopper. Simultaneously with the downward movement of the loaded hopper 10, the contiguous arm 21 moving downward under the tilting action of frame 5, pushes arm 18 downward between the pins 16 and 17, of arm 15, of the loaded hopper, it being understood that the downward movement of said arm 18 is more rapid and extended than the downward movement of said arm 15, because of an advantage in leverage. In the downward movement of arm 18 the dog 20 swings upward under the resistance of pin 17 until shoulder 19 is below the horizontal plane of said pin, when arm 18 swings outward, to cause its shoulder 19 to underlie said pin. After a predetermined quantity of grain has been delivered to the empty or raised hopper, the latter counter-balances the fully charged or lowered hopper, and re-rocks the frame 5 to its original position, it being understood that this re-rocking action is possible under the weight of a smaller quantity of grain in the raised hopper than in the lower one, because the former has a decided advantage in leverage, it being remembered that the rocking action of frame 5 occurred with the bearing arm 7, contiguous to the lowered hopper, as the fulcrum.

As the loaded hopper is reëlevated, as explained, by the partially loaded companion hopper, the said shoulder 19 tends to move upwardly more rapidly than arm 15, and thus exerts an upward pull on pin 17, sufficient to break the toggle or brace formed by link 14 and swing-arm 15, and thus permit the grain in the fully charged hopper 10, to force the underlying gate 12 open, and begin to flow into the concentrating hopper 51. As the gate is thus opened its handle swings upwardly, and therefore imparts like movement to swing-arm 15, the upward movement of said arm upon arm 18, causing the latter to swing outward. Said upward movement of arm 15 incidentally swings dog 20 upward, as indicated by the arrow, Fig. 1, the upward movement of the arm 15 continuing until said dog is released and drops back to its original position, as shown at the right hand side of Fig. 1.

All the grain from the loaded hopper escapes before the companion one is fully charged, so as to give the gate of the emptied one an opportunity to re-close automatically before the time arrives for the second or further downward movement of the hopper being charged, it being noticed that when the gate re-closes, arm 15 swings downward until its pin 17 is again below shoulder 19, of arm 18. When the hopper being charged is fully loaded, the actions hereinbefore described are repeated. It will thus be seen that the hoppers 10 alternately weigh and discharge the grain into the concentrating hopper below.

To effect a quicker operation of the chute and therefore more accurate weighing of the hoppers 10, the mechanism shown in Fig. 4, most clearly is employed. By reference to said figure it will be seen that the resistance of the weighted rod 36 must be overcome before either hopper, when loaded can descend and that as the frame 5 tilts under the downward movement of the loaded hopper, it raises arm 40 and its roller 39 and incidentally the said weighted rod 36, it being noted that as said rod starts upward roller 39 will travel outward upon it so as to more easily lift it and insure a quicker downward movement of the loaded hopper and upward movement of the unloaded hopper, the result of this being to effect the more rapid reversal of the chute 30 and by such rapid deflection of the grain into the unloaded hopper, avoid the deposit of any material surplus or overweight grain in the loaded hopper. It will also be apparent that the weighted rod 36 maintains its elevated position until the loaded hopper is counterbalanced by the partially loaded one, returning to its original position when the tilting frame returns to its horizontal position.

Referring now to the concentrating hopper, it will be seen that when it is charged by one of the hoppers 10 with a weight of grain in excess of that indicated by the poise 47 on beam 45, it descends and through the connections described closes the valve 28 and holds the same closed until sufficient grain has escaped from spout 52 to permit poise 47 to reëlevate the concentrating hopper, the descent of the weight incidentally reopening the valve and permitting the grain from hopper 25 to be delivered by the chute into the empty or elevated hopper. It will thus be seen that any possibility of sufficient grain being delivered to hopper 51 to overflow the same is avoided.

From the above description it will be apparent that I have produced an automatic scale possessing the features of advantage enumerated as desirable and I wish it to be understood that I reserve the right to make all changes properly falling within the spirit and scope of the appended claims.

Having thus described the invention what I claim as new and desire to secure by Letters-Patent, is:—

1. In a machine of the character described, a suitable support, a tilting frame provided at opposite sides of its center with bearings resting on the support and adapted to alternately form fulcrum points, hoppers carried by said frame, means to prevent creepage of the tilting frame on said support, a delivery chute to deliver grain alternately to said hoppers, means whereby the upward movement of either hopper shall result in tilting the chute so that it shall deliver grain to the elevated hopper, and means for effecting a quick change in the relative weight of the hoppers with each tilting operation to facilitate said operation and the tilting of the chute.

2. In a machine of the character described, a suitable support, a tilting frame provided at opposite sides of its center with bearings on the support and adapted to alternately form fulcrum points, hoppers carried by said frame, means to prevent creepage of the tilting frame on said support, a delivery chute to deliver grain alternately to said hoppers, means whereby the upward movement of either hopper shall result in tilting the chute so that it shall deliver grain to the elevated hopper, a weighted lever connected to resist tilting movement of the tilting frame, and a hanger pivotally suspended from the tilting frame and underlying the weighted lever and adapted as it moves upward with the tilting frame to rise and travel outward on said lever to decrease the leverage on the latter, and as the tilting frame moves downward to travel inward on the lever to permit the latter to increase its leverage on the tilting frame and facilitate the downward movement of the latter.

3. In a machine of the character described, a suitable support, a tilting frame, a hopper supported thereby, a valve controlling its discharge end, a hopper-carrying weighing mechanism carried by said support and connections between the weighing beam of said weighing mechanism and the valve of said hopper to close said valve when the weighing lever is elevated and reopen it when said weighing hopper moves downward.

4. In a grain weighing machine, a pair of hoppers having gates controlling their lower or discharge ends, adapted to move upward and downward alternately in the weighing operation, a stationary hopper between and above the first-named hoppers, equipped with a valve, a tiltable chute arranged below the stationary hopper and the first-named hoppers, means projecting from the first-named hoppers for alternately tilting said chute in opposite directions to cause the same to deliver grain from the stationary hopper into the hopper of the first-pair from which the grain was last discharged, a concentrating hopper below said pair of hoppers, weighing mechanism independent of said pair of hoppers for supporting the concentrating hopper, and means whereby the downward movement of the concentrating hopper shall close the valve of the stationary hopper and upward movement of the concentrating hopper shall result in reopening said valve.

5. In a grain weighing machine, a suitable support, a tilting frame thereon, hoppers carried by said frame one being adapted to rise and the other to fall with each tilting operation of said tilting frame, a stationary hopper between the first-named hoppers, a tilting chute below the stationary hopper, means actuated by the first-named hoppers to tilt the chute and cause the same to deliver grain from the stationary hopper into the elevated hopper of the first pair, a weighted lever fulcrumed on said support and adapted to swing vertically, and a hanger pivotally connected to the tilting frame and adapted each time it rises with said frame to elevate and swing outward upon said lever and when it descends to reverse this movement and permit the weighted end of said lever to descend.

In testimony whereof I affix my signature, in the presence of two witnesses.

MONROE DAVIS.

Witnesses:
H. C. RODGERS,
G. Y. THORPE.